United States Patent [19]

Hoashi et al.

[11] Patent Number: 4,811,232

[45] Date of Patent: Mar. 7, 1989

[54] APPARATUS FOR MEASURING WHEEL SPEED FOR ANTI-SKID CONTROL SYSTEM

[75] Inventors: Akira Hoashi, Kawasaki; Hideo Akima, Yokohama; Takao Maki, Saitama; Isao Yamaki, Iwatsuki, all of Japan

[73] Assignees: Fujitsu Limited, Kawasaki; Akebono Brake Industry Co., Ltd., Tokyo, both of Japan

[21] Appl. No.: 36,997

[22] Filed: Apr. 10, 1987

[30] Foreign Application Priority Data

Apr. 10, 1986 [JP] Japan .................................. 61-083087

[51] Int. Cl.$^4$ ................................................ B60T 8/32
[52] U.S. Cl. ............................. 364/426.02; 364/565; 364/571.05; 303/95; 324/161
[58] Field of Search ..................... 364/565, 426, 571; 303/92, 95; 361/238; 324/160–162, 166

[56] References Cited

U.S. PATENT DOCUMENTS

| | | |
|---|---|---|
| 4,497,026 | 1/1985 | Braschel et al. .................... 364/426 |
| 4,669,046 | 5/1987 | Kubo ................................... 364/426 |
| 4,670,852 | 6/1987 | Masaki et al. ....................... 364/426 |
| 4,680,713 | 7/1987 | Kubo ................................... 364/426 |
| 4,718,013 | 1/1988 | Kubo ................................... 364/426 |

FOREIGN PATENT DOCUMENTS 1305430  1/1973  United Kingdom .

Primary Examiner—Gary Chin
Attorney, Agent, or Firm—Staas & Halsey

[57] ABSTRACT

An apparatus for measuring the wheel speed for an anti-skid control system of a motor vehicle, comprising a sensor for generating a pulse signal, the cycle of which corresponds to the rotational speed of the wheel. The wheel speed signal is provided in every control cycle having a constant time. If the wheel speed is not provided because the rotational speed of the wheel is low, the anti-skid control is performed in accordance with a compensated wheel speed calculated on the basis of the wheel speed measured immediately beforehand.

3 Claims, 6 Drawing Sheets

READING WHEEL SPEED

APPARATUS FOR MEASURING WHEEL SPEED FOR ANTI-SKID CONTROL SYSTEM

BACKGROUND OF THE INVENTION

1. Field of the Invention

This invention relates to an anti-skid control system for achieving a satisfactory rotational behavior of wheels of a motor vehicle during a braking operation. More particularly, this invention pertains to an apparatus for measuring a wheel speed for an anti-skid control system, using a pulse signal corresponding to the actual wheel speed and output from a wheel speed sensor.

2. Description of the Related Art

There have heretofore been proposed a variety of anti-skid control systems, wherein during a braking operation, the brake fluid pressure is reduced to prevent the occurrence of an undesirable wheel lock, and the brake fluid pressure thus reduced is then increased to avoid an undesirable extension of the brake stopping distance. Among such conventional anti-skid control systems is one wherein different pressure buildup rates are stored; a desired one of the stored pressure buildup rates is selected; and brake fluid pressure is increased with the selected buildup rate, for example. To effect the pressure buildup rate selection, a system has been proposed, wherein a solenoid-operated valve adapted to be opened and closed with a relatively high frequency is provided in the brake fluid pressure buildup system; a pulse train generator such as a multivibrator is provided in the drive system for the solenoid-operated valve; and the timing with which the solenoid-operated valve is driven by a pulse train signal derived from the multivibrator, is controlled on the basis of a signal representing wheel acceleration (British Patent Specification No. 1305430).

In a conventional anti-skid control system of a motor vehicle, each of the wheels is provided with a wheel speed sensor, which outputs a pulse signal corresponding to the rotational speed of the wheel, and the cycle of the pulse signal is counted to determine the wheel speed. The wheel speed thus measured is read at constant intervals to execute an anti-skid brake control. Therefore, the change of the wheel speed thus measured on the basis of the pulse signal supplied from the wheel speed sensor has a step-like configuration, even though the actual wheel speed is reduced continuously. Particularly, under a low speed running condition, the cycle of the pulse signal for measuring a wheel speed becomes relatively longer, compared with the cycle for executing an anti-skid brake control. In this case, the difference between the measured wheel speed and the actual wheel speed becomes larger, thereby causing an error or delay in an operation to control the brake pressure when executing an anti-skid brake control.

SUMMARY OF THE INVENTION

Accordingly, it is an object of the present invention to provide an apparatus for measuring a wheel speed in an anti-skid control system, which is designed to compensate the wheel speed signal basis of a value measured immediately beforehand.

According to the present invention, there is provided an apparatus for measuring the wheel speed for an anti-skid control system of a motor vehicle, comprising: a wheel speed sensor for generating a pulse signal, the cycle (i.e., period) of which corresponds to the revolutional speed of each wheel of the motor vehicle; means for measuring the cycle of the pulse signal from the wheel speed sensor in order to calculate a wheel speed; means for generating a control cycle for performing an anti-skid control; means for providing the wheel speed signal measured by the measuring means in every, control cycle; means for compensating the wheel speed signal on the basis of the wheel speed measured immediately beforehand, if the wheel speed is not provided because the revolutional speed of the wheel is low, so that the anti-skid control is performed in accordance with the compensated wheel speed for control cycle in which the wheel speed is low.

When the real wheel speed becomes low, the cycle of the wheel speed measured by the wheel speed measuring means becomes longer than the cycle for executing the anti-skid brake control. In this case, a wheel speed at this control cycle is determined on the basis of a preceding wheel speed or deceleration actually measured or compensated. The compensated wheel speed is used to control anti-skid braking to prevent a possible failure of braking or a delay in a braking operation, particularly in a low speed running condition.

DESCRIPTION OF THE PREFERRED EMBODIMENTS

Figure 1:
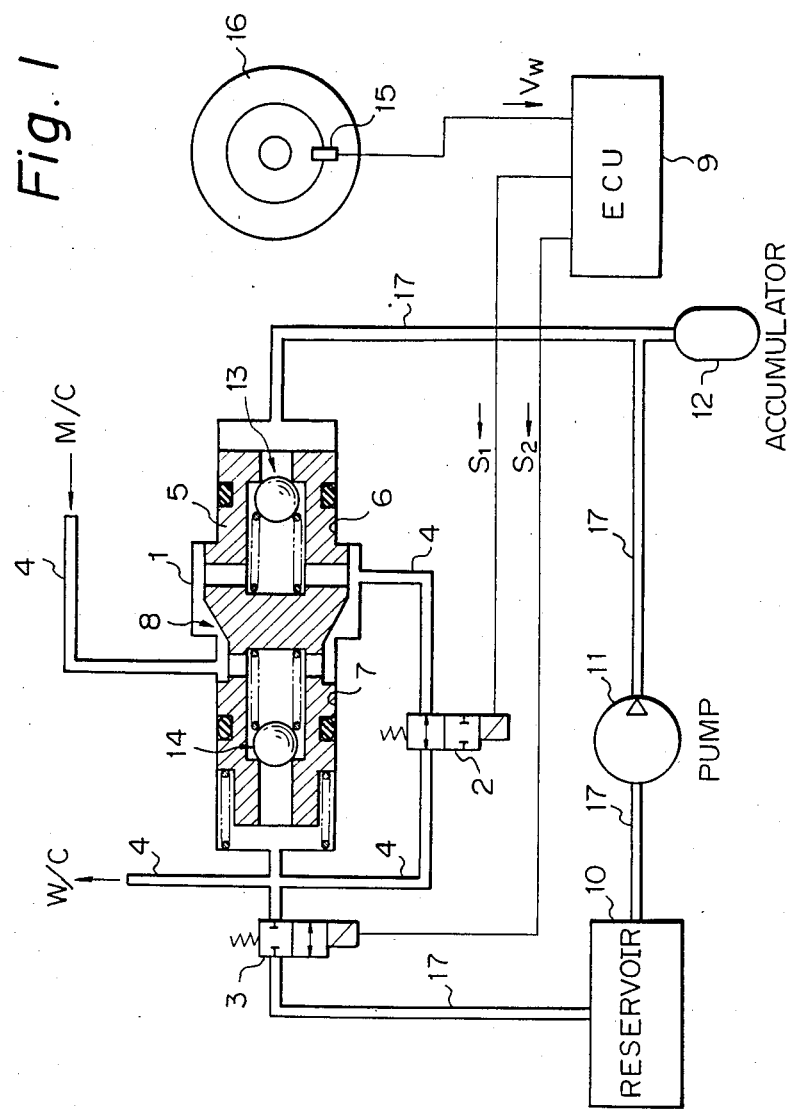
FIG. 1 is a diagrammatic view of an anti-skid control apparatus to which the present invention is applicable.

FIG. 1 illustrates in an anti-skid control apparatus to which the present invention is applicable, which includes a gate valve 1, a pressure buildup-holding solenoid-operated valve (referred to simply as first valve hereinafter) 2, a pressure-reducing solenoid-operated valve (referred to simply as second valve hereinafter) 3, a main fluid passage 4 extending from a master cylinder M/C (not shown) to wheel cylinders W/C of wheel brake devices (not shown) through the gate valve 1 and first valve 2, and so forth.

The gate valve 1 includes cylinders 6 and 7 containing a differential pressure-responsive piston 5 which is arranged to close a valve portion 8 of the gate when the piston 5 is displaced to the left in the drawing due to a pressure difference. Upon closure of the valve portion 8, the main passage 4 extending between the master cylinder M/C and the wheel cylinders W/C is interrupted.

The first valve 2, which is normally open, is closed in response to a brake fluid pressure holding signal $S_1$ derived from a control circuit 9, and thereupon, the main passage 4 is interrupted so that a brake fluid pressure holding condition is established.

The second valve 3, which is normally closed, is opened in response to a pressure-reducing signal $S_2$ also derived from the control circuit 9, and thereupon pressure fluid in the wheel cylinder W/C is pumped into an accumulator 12 by means of a pump 11 through a reservoir 10 and the thus pumped pressure fluid is returned between the gate valve 1 and the first valve 2 through a by-pass passage 17. Indicated at 13 and 14 are a check valve and relief valve, respectively.

A wheel velocity detector or speed sensor 15 is associated with a wheel 16 and arranged to provide detected information to the control circuit 9.

A motor vehicle is usually provided with two such anti-skid control apparatuses as shown in FIG. 1; one for controlling front left and rear right wheels and the other for controlling front right and rear left wheels.

Figure 2:
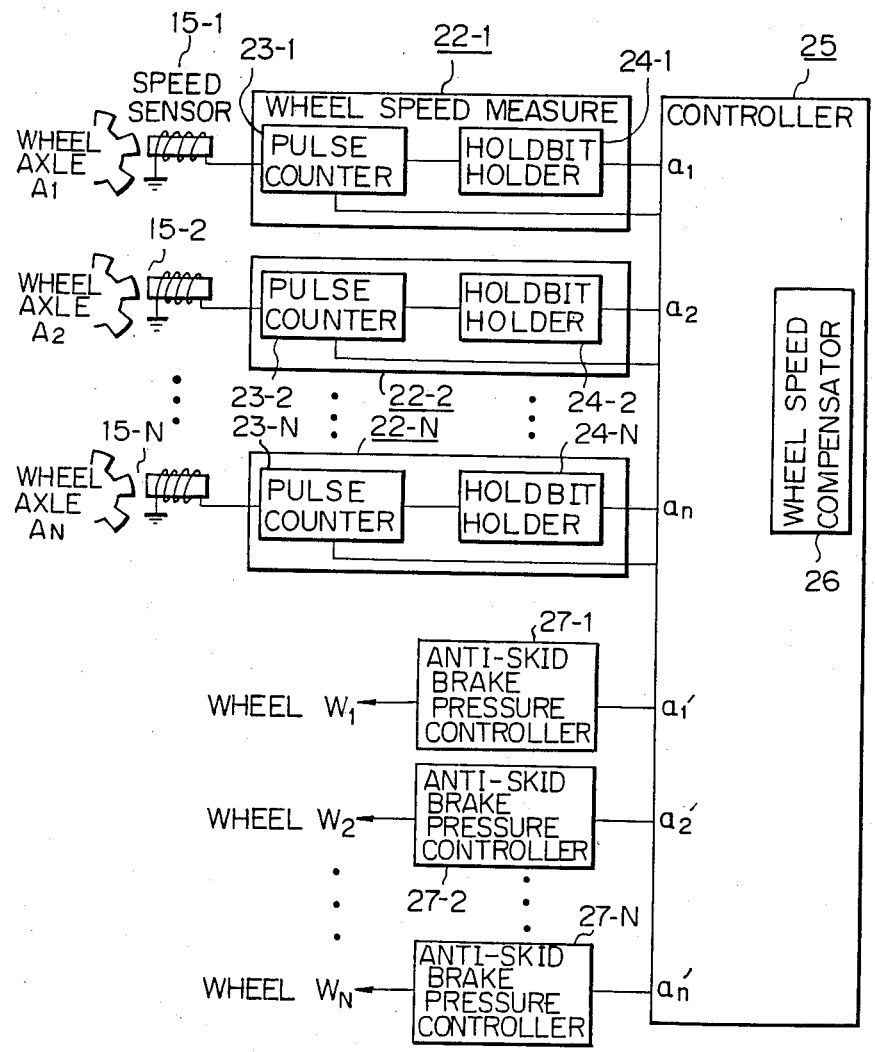
FIG. 2 is a schematic block diagram of the control circuit which is usable with the apparatus of FIG. 1.
Figure 3:
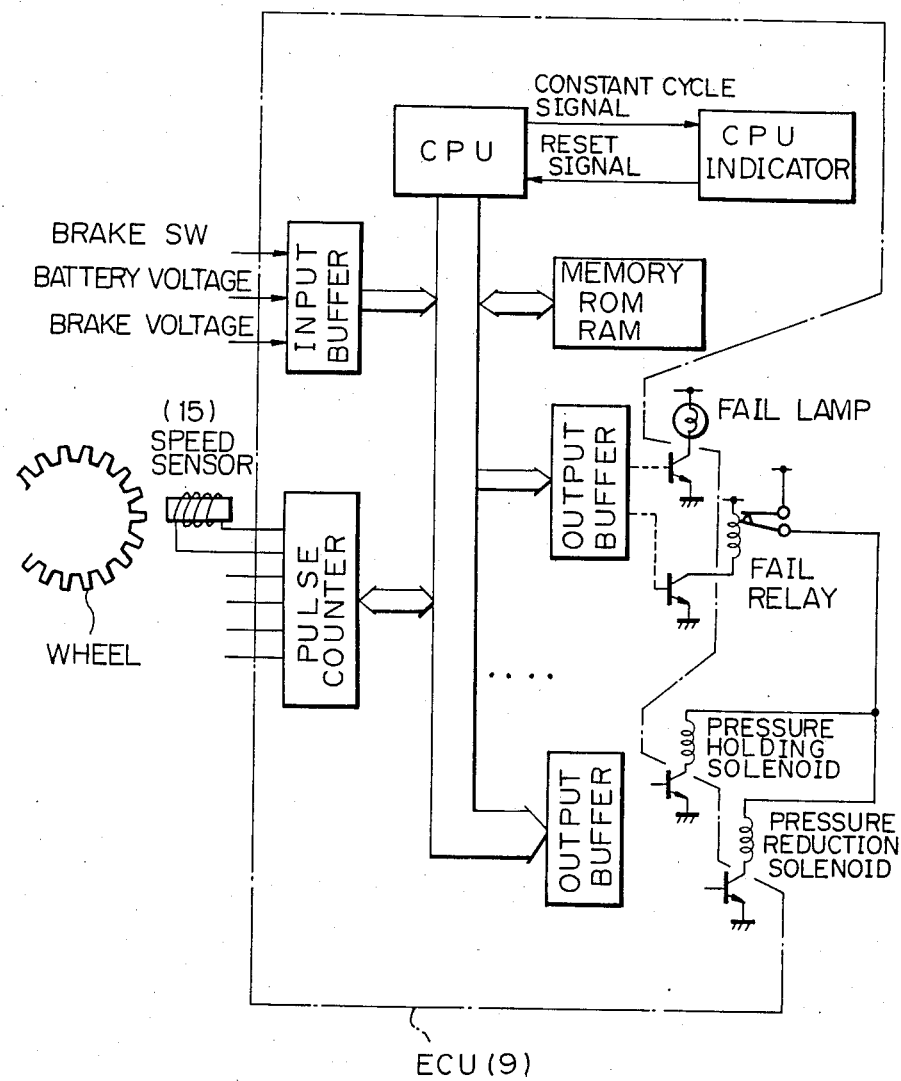
FIG. 3 is a block diagram illustrating an embodiment of the control circuit which is usable with the apparatus of FIG. 1.

In FIGS. 2 and 3, the wheel speed sensors 15-1 to 15-N generate pulse signals corresponding to the revolutional speed of the wheel axles $A_1$ to $A_N$, respectively. Each sensor 15 generates 100 pulses, for example, for one revolution of the wheel.

Wheel speed measuring units 22-1 to 22-N measure the cycles (periods) of the pulse signals output from the speed sensor 15-1 to 15-N, respectively, and calculate the wheel speeds of the respective wheels. Each of the pulse cycle counting circuits 23-1 to 23-N counts clock pulses during the time from one pulse signal until the next pulse signal to measure the wheel speed. Each of the holding counting circuits 24-1 to 24-N indicates that the pulse cycle counting circuits 23-1 to 23-N have completed the measurement of the wheel speed.

A wheel speed compensating means 26 in a controller 25 provides a wheel speed signal compensated on the basis of a deceleration of the wheel speed which has been measured immediately beforehand, if the cycle of the wheel speed measured by the wheel speed measuring units 22-1 to 22-N becomes longer than the cycle for executing the anti-skid brake control.

The controller 25 generates anti-skid control signals calculated in accordance with the wheel speed compensated by the wheel speed compensating means 26 to control the braking of the respective wheels $W_1$ to $W_N$ through anti-skid brake pressure control units 27-1 to 27-N.

When the real wheel speed becomes low, the cycle (period) of the wheel speed measured by the wheel speed measuring units 22-1 to 22-N becomes longer than the cycle for executing the anti-skid brake control. In this case, as mentioned above, the wheel speed compensating means 26 determines a deceleration of the wheel speed which has been measured immediately beforehand and calculates a wheel speed compensated on the basis of the deceleration thus determined. This is based on an assumption that a same deceleration of the wheel speed continues from the time when it was actually measured immediately beforehand until the present. Because the compensated wheel speed is used to control anti-skid braking, it is possible to prevent a possible braking failure or a delay in the braking operation, particularly in a low speed running condition. Therefore, an anti-skid brake control can be effectively performed even in the lower speed region.

Figure 4:
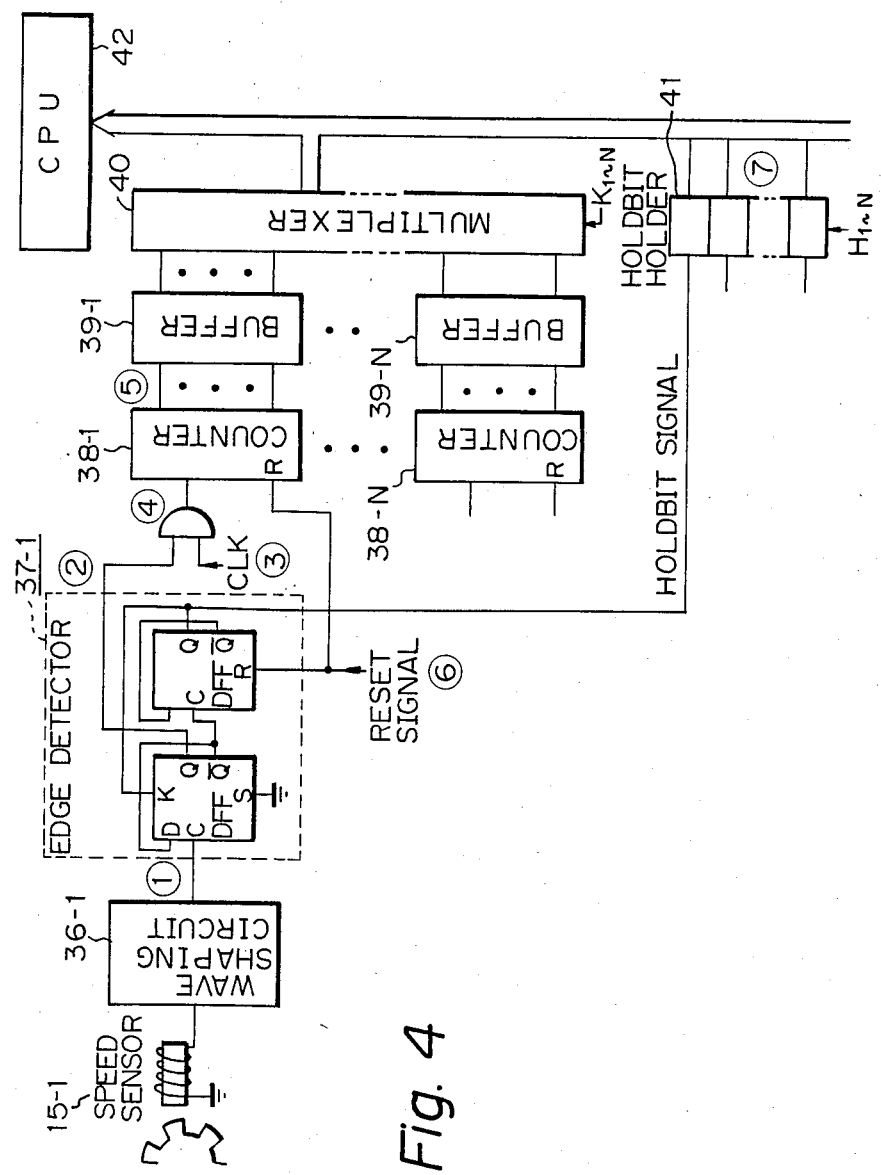
FIG. 4 is a block diagram of a wheel speed measuring circuit used in this invention.
Figure 5:
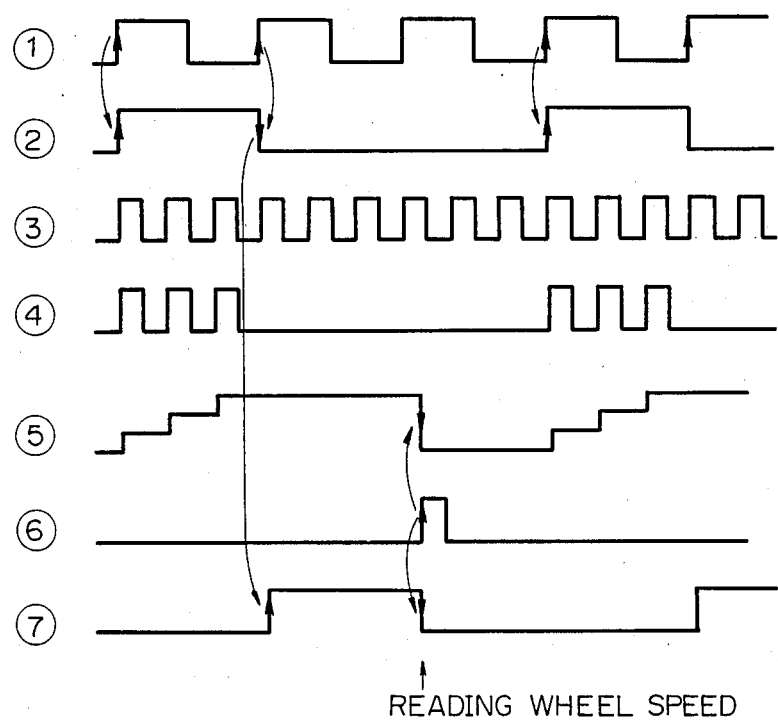
FIG. 5 is a diagram illustrating waveforms for explaining the operation of the circuit shown in FIG. 4.

In FIGS. 4 and 5, a wave shaping circuit 36-1 shapes the pulse wave detected by the wheel speed sensor 15-1 to change a rectangular pulse, which is shown at 1 in FIG. 5. A edge detecting circuit 37-1 detects the up or down edges of the rectangular pulse to generate a pulse signal corresponding to the cycle (period), which is shown at 2 in FIG. 5.

Each of the counters 38-1 to 38-N counts clock signals during the time period of one cycle of the wheel speed pulse generated in the edge detecting circuit 37-1. The clock signal is shown at 3 in FIG. 5. The signals input to and output from the counters 38-1 to 38-N are shown at 4 and 5 in FIG. 5, respectively. Each of the bu 39-1 to 39-N holds the wheel speed pulse measured by the counter 38-1 to 38-N. A multiplexer 40 selects the pulse signals held in the buffers 39-1 to 39-N and feeds the selected signals to a data bus. Each of the holding circuits 41 holds the results of measurements, i.e., the cycle of the wheel speed pulse measured by the counters 38-1 to 38-N. The hold signal held in the holding circuits 41 is shown at 7 in FIG. 5.

CPU 42 triggers the holding circuits 41, and through the multiplexer 40, reads the values which are already set and stored in the buffers 39-1 to 39-N. Then, the CPU 42 supplies a RESET signal, as shown at 6 in FIG. 5, to reset the edge detecting circuit 37-1, the counters 38-1 to 38-N, and so on. When the edge detecting circuit 37-1 is reset, the holding circuits 41 are also reset.

Figure 6:
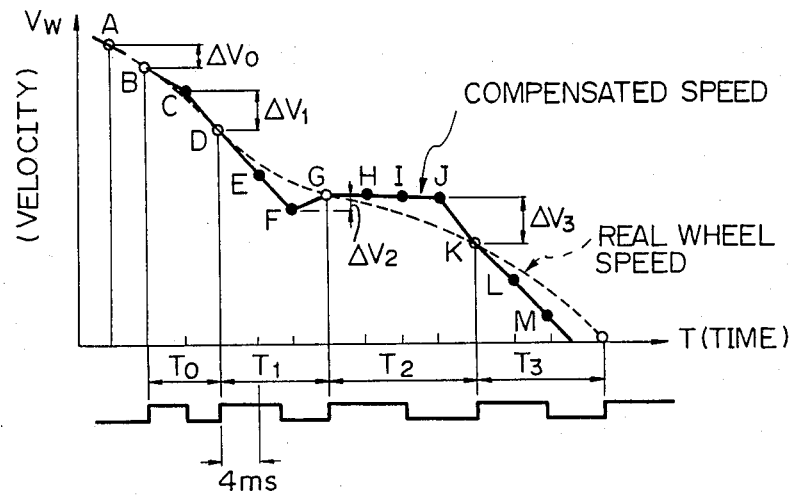
FIG. 6 is a diagram for explaining the wheel speed compensation according to this invention; and, FIG. 7 is a diagram for explaining existing wheel speed detection.

Referring now to FIG. 6, the ordinate indicates the wheel speed $(V_W)$ and the abscissa indicates the time (T). A scale on the abscissa (T) indicates the cycle of detecting the wheel speed for anti-skid brake control. $T_0$ to $T_3$ indicate the periods of detecting the wheel speed by the wheel speed measuring units 22-1 to, 22-N.

In FIG. 6, a dotted line indicates actual wheel speed and a solid line indicates the speed compensated according to the present invention. Points A, B, D, G, and K indicate the values of wheel speed $(V_W)$ measured by the wheel speed measuring units 22-1 to 22-N. Points C, E, F, H, I, J, L, and M indicate the values of wheel speed compensated in a wheel speed compensator 26, FIG. 2 on the basis of deceleration immediately beforehand.

First, at both points A and B, the wheel speed is actually measured by the wheel speed measuring units 22-1 to 22-N. Therefore, an anti-skid brake control is performed on the basis of the measured values $V_A$ and $V_B$ of the wheel speed at points A and B, respectively.

Second, at point C, no wheel speed measurement is effected by the units 22-1 to 22-N, since the time of detecting the wheel speed by the wheel speed measuring units 22-1 to 22-N is $T_0$ as shown. Therefore, the deceleration $\Delta V_0$ between points A and B immediately before point C is determined at first as follows.

$$\Delta V_0 = V_A - V_B \tag{1}$$

Then, assuming that the deceleration $\Delta V_0$ thus determined continues, the wheel speed $V_C$ at point C is calculated as follows, and an anti-skid brake control is performed at point C on the basis of this assumed wheel speed $V_C$.

$$V_C = V_B - \Delta V_0 \tag{2}$$

Third, at point D, the wheel speed is actually measured by the wheel speed measuring units 22-1 to 22-N. Therefore, an anti-skid brake control is performed on the basis of the measured wheel speed $V_D$ at point D.

Fourth, at both points E and F, no wheel speed measurement is effected by the wheel speed measuring units 22-1 to 22-N, since the time of detecting the wheel speed by the unit 22-1 to 22-N is $T_1$ as shown. Therefore, the deceleration $\Delta V_1$ between points C and D immediately before the point E is determined at first as follows.

$$\Delta V_1 = V_C - V_D \quad (3)$$

Then, assuming that the deceleration $\Delta V_1$ thus determined continues, the wheel speeds $V_E$ and $V_F$ are calculated as follows, and an anti-skid brake control is performed on the basis of these assumed wheel speeds $V_E$ and $V_F$ at points E and F, respectively.

$$V_E = V_D - \Delta V_1 \quad (4)$$

$$V_F = V_E - \Delta V_1 \quad (5)$$

Fifth at point G, the wheel speed is actually measured by the wheel speed measuring units 22-1 to 22-N. Therefore, anti-skid brake control is performed on the basis of the measured wheel speed $V_G$ at the point G.

Sixth, at points H, I, and J, no wheel speed measurement is provided by the wheel speed measuring units 22-1 to 22-N, since the time of detecting the wheel speed by the units 22-1 to 22-N is $T_2$ as shown. Therefore, the deceleration $\Delta V_2$ between points F and G immediately before point H is determined at first as follows.

$$\Delta V_2 = V_F - V_G \quad (6)$$

In this case, since the deceleration $\Delta V_2$ thus determined is a negative value, i.e., acceleration, the wheel speeds $V_H$, $V_I$, and $V_J$ are compensated such that either of these values is identical to the wheel speed $V_G$ immediately before the point thereof as shown below and an anti-skid brake control is performed on the basis of this value at these points H, I, and J.

$$V_H = V_I = V_J = V_G \quad (7)$$

Seventh, similarly, at points K, L, and M, the respective wheel speeds $V_K$, $V_L$, and $V_M$ are measured or calculated as follows and an anti-skid brake control is performed on the basis of these values at the point K, L, and M.

$$V_K = V_{VK} \text{ (measured)} \quad (8)$$

$$V_L = V_K - \Delta V_3 \quad (9)$$

$$V_M = V_L - \Delta V_3 \quad (10)$$

Figure 7:
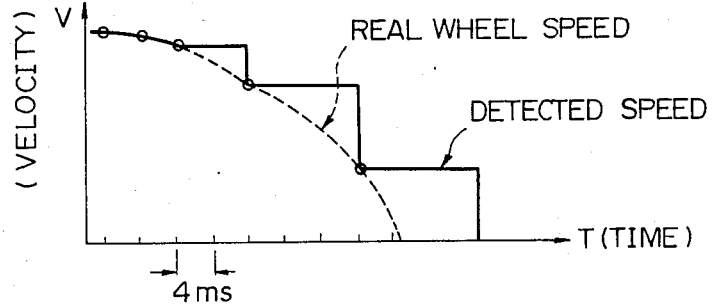

FIG. 7 illustrates a diagram for explaining existing wheel speed detection, in which the cycle of the pulse signal from the wheel speed sensor is counted to determine the wheel speed, which is read at every constant cycle for executing an anti-skid brake control. Therefore, the change of the wheel speed thus measured on the basis of the cycle of pulse signal supplied from the wheel speed sensor has a step-like configuration, even though the actual wheel speed is reduced continuously, as mentioned hereinbefore.

We claim:

1. An apparatus for measuring wheel speed for an anti-skid control system of a motor vehicle having anti-skid control cycles for executing anti-skid control, said apparatus comprising:
   wheel speed sensor means for generating a pulse signal, having cycles which correspond to a revolutional speed of a wheel of the motor vehicle;
   measuring means for measuring the cycles of the pulse signal from said wheel speed sensor means and deriving the corresponding revolutional speed of the wheel;
   means for generating a constant control cycle signal having a constant time interval, initiating the anti-skid control cycles;
   means for providing a wheel speed signal based on the cycles of the pulse signal measured by said measuring means and indicating the corresponding revolutional speed of the wheel, for each of the anti-skid control cycles;
   compensating means for compensating said wheel speed signal on the basis of a calculated difference between one of, a previously measured wheel speed and a calculated wheel speed, two previously measured wheel speeds, and two calculated wheel speeds, said compensating means providing a compensated wheel speed signal when one of the cycles of the pulse signal from said wheel speed sensor becomes longer than the constant time interval of the constant control cycle signal, so that anti-skid control is performed in accordance with said compensated wheel speed signal.

2. An apparatus as set forth in claim 1, wherein said compensating means comprises calculating means for calculating said compensated wheel speed signal on the basis of one of:
   a first difference value between two preceding values of said wheel speed signal; and
   a second difference value between a preceding value of said wheel speed signal and a preceding value of said compensated wheel speed signal.

3. An apparatus as set forth in claim 2, wherein said calculating means further comprises:
   means for calculating said first and second difference values;
   means for providing said compensated wheel speed signal being equal to a preceding value of said wheel speed signal when said first difference value is negative; and
   means for providing said compensated wheel speed signal being equal to a preceding value of said wheel speed signal when said second difference value is negative.

* * * * *

UNITED STATES PATENT AND TRADEMARK OFFICE
CERTIFICATE OF CORRECTION

PATENT NO. : 4,811,232
DATED : March 7, 1989
INVENTOR(S) : Akira Hoashi et al.

It is certified that error appears in the above-identified patent and that said Letters Patent is hereby corrected as shown below:

Col. 1, line 61, after "signal" insert --on the--;

Col. 2, line 5, "every," should be --every--;

Col. 3, line 64, "1" should be -- ① --;
line 68, "2" should be -- ② --;

Col. 4, line 4, "3" should be -- ③ --;
line 6, "4 and 5" should be -- ④ and ⑤ --;
line 7, "bu" should be --buffers--;
line 14, "7" should be -- ⑦ --;
line 18, "6" should be -- ⑥ --;
line 29, after "indicates" insert --the--;

Col. 5, line 45, equation (8), "$V_{vK}$" should be --$V_K$--.

Signed and Sealed this

Tenth Day of October, 1989

*Attest:*

DONALD J. QUIGG

*Attesting Officer*      Commissioner of Patents and Trademarks